United States Patent [19]

Hsu

[11] 4,128,341
[45] Dec. 5, 1978

[54] EXTRUDER SCREW
[75] Inventor: John S. Hsu, Nashua, N.H.
[73] Assignee: Ingersoll-Rand Co., Woodcliff Lake, N.J.
[21] Appl. No.: 792,469
[22] Filed: Apr. 29, 1977
[51] Int. Cl.² ............................ B01F 7/08; B29B 1/10
[52] U.S. Cl. .................................... 366/89; 366/323; 425/208
[58] Field of Search ............... 259/9, 10, 191, 192, 259/97; 264/86, 176 R, 349; 425/206-209

[56] References Cited
U.S. PATENT DOCUMENTS

| | | | |
|---|---|---|---|
| 3,271,819 | 9/1966 | Lacher | 259/191 |
| 3,496,603 | 2/1970 | Listner | 425/208 |
| 3,698,541 | 10/1972 | Barr | 259/191 |
| 3,701,512 | 10/1972 | Schippers | 259/191 |
| 3,858,856 | 1/1975 | Hsu | 259/191 |
| 3,905,588 | 9/1975 | Reinhart | 259/10 |
| 4,000,884 | 1/1977 | Chung | 259/191 |

Primary Examiner—Philip R. Coe
Assistant Examiner—Timothy F. Simone
Attorney, Agent, or Firm—Frank S. Troidl

[57] ABSTRACT

The extruder screw has a solid feed section followed by a solid-melt transition section, followed by a melt metering section. A solid feed channel extends from the feed end of the extruder screw up to a point within the solid-melt transition section. A solid-melt channel extends longitudinally from the beginning to the end of the solid-melt transition section. A melt channel begins within the solid-melt transition section just after the end of the solid feed channel and extends longitudinally to the end of the melt metering section.

3 Claims, 8 Drawing Figures

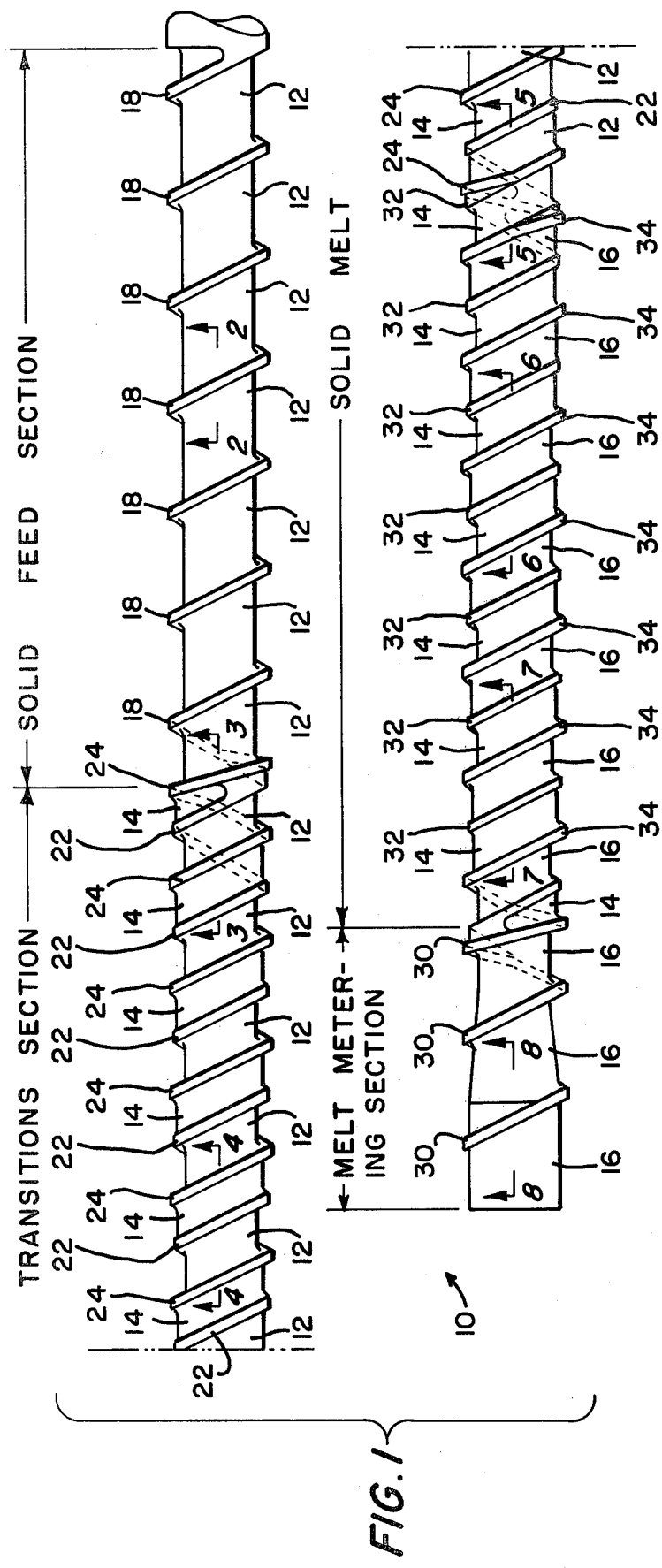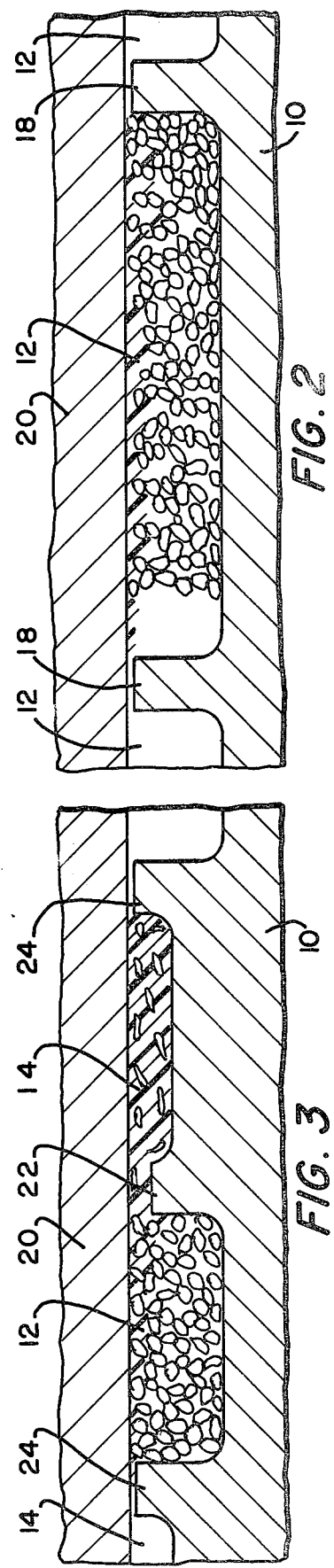

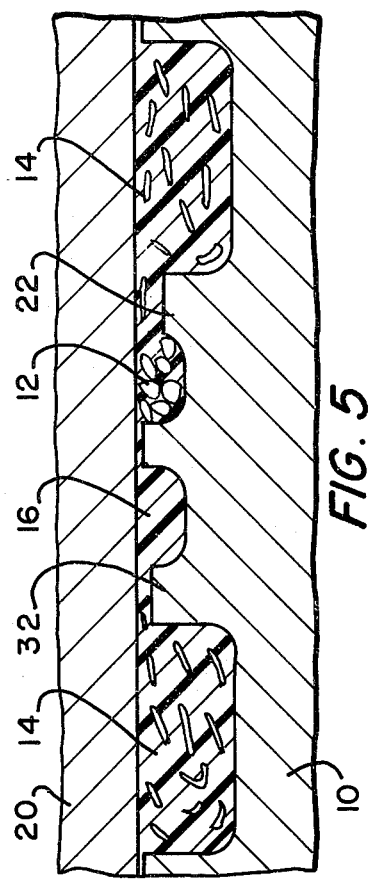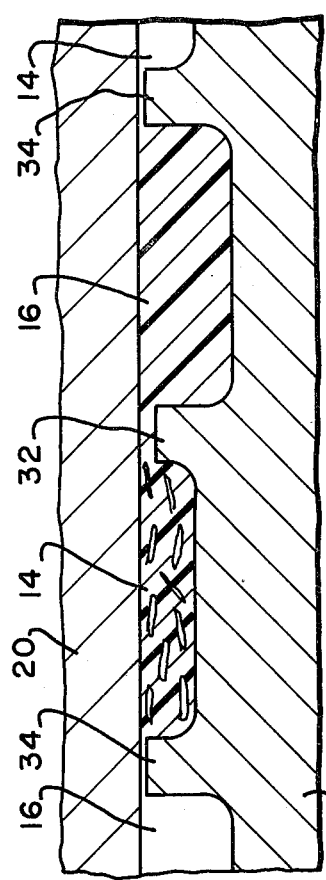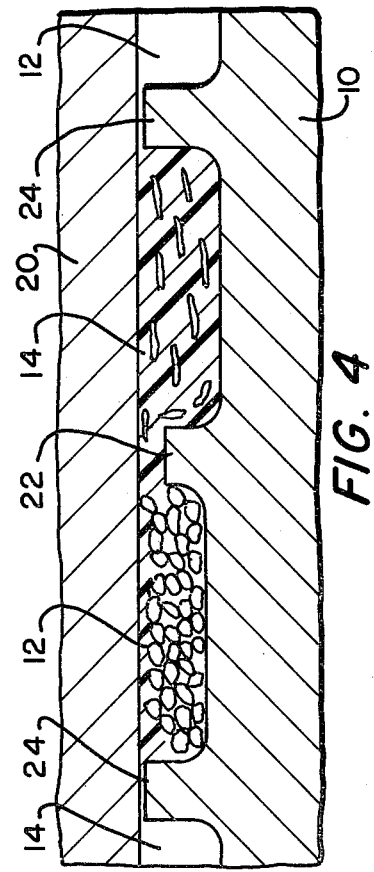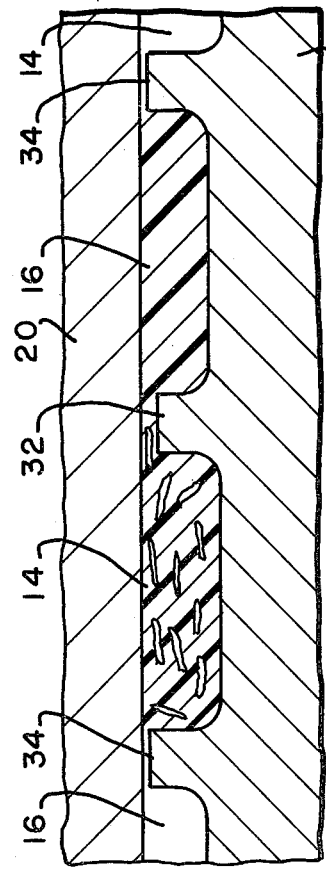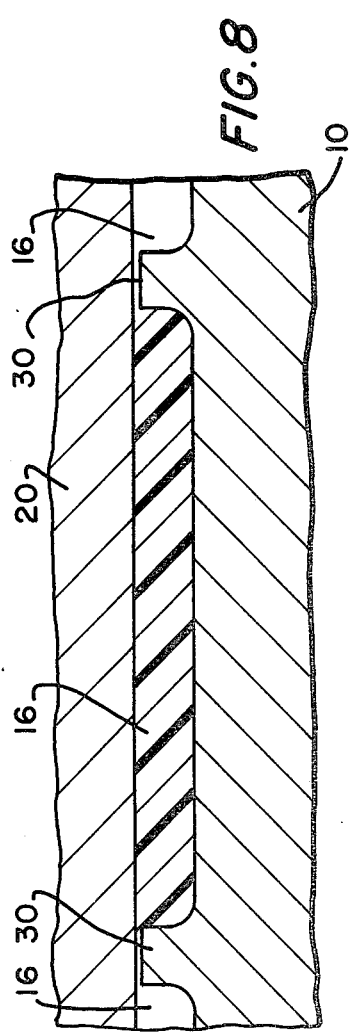

EXTRUDER SCREW

This invention is an improved extruder screw for use in an extrusion apparatus for working a wide range of solid plastic materials into a substantially homogeneous molten state suitable for formation into any desired shape by extrusion or injection into a die or mold.

The basic function of an extruder feed screw is to convey solid plastics from the hopper, melt them and deliver them against the head pressure so that the melt can be shaped to the desired profile. The conventionally designed screw consists of three sections: feed, transition, and metering. Nearly all of them have a square pitch in a single open channel from one end to the other. The feed section is to convey solids from the hopper into the barrel. The feed section depth is generally selected according to the solids bulk density. The tapered transition section is to compensate for the volume decrease as the bulk material is compressed. It also forces the plastics tight against the barrel inner wall for good heat conduction and efficient melting by mechanical shearing.

The metering section is the pumping end of the screw. It is also the final stage to completely melt and homogenize the plastics. The depth of this section is mainly designed according to the melt viscosity. Resins with a low melt viscosity and/or applications requiring high temperature melt need shallow metering sections, and vice-versa.

The plastic melting process with conventional screws can be briefly described as follows: Solids conveyed into the feed section pick up heat from the hot barrel surface. A layer of melt film starts to form on the outside of the packed solids bed and sticks onto the barrels inner wall. This layer of thin film is constantly scraped off and collected in front of the rotating screw flight.

Due to the whirling motion of melt pool as it is forwarded inside the screw channel, unmelted pieces break away from the solids bed and float in the melt pool. A relatively shallow and long metering section then becomes a must if there are no other high shearing or intensive mixing devices downstream. Screws with shallow metering sections produce relatively lower outputs at relatively higher melt temperature.

To prevent unmelted solids from breaking away from the solids bed, barrier flighted screws have been designed with two separate channels: one holds solids and the other holds melts. The melt flowing into the latter one must pass through a small flight clearance gap. Screws with this construction can have a deeper metering section because its function is only to pump melt out. Examples of barrier flighted screws with two separate channels are shown in U.S. Pat. No. 3,698,541 patented Oct. 17, 1972 in the name of Robert A. Barr, and U.S. Pat. No. 3,858,856 patented Jan. 7, 1975 in the name of John S. Hsu.

With this improved extruder screw, the melting efficiency is increased and the melt is delivered at the end of the screw at a lower temperature than the temperature of the melt delivered by previous extruder screws, such as the extruder screws shown in the above mentioned U.S. Pat. Nos. 3,698,541 and 3,858,856.

Briefly described, this new extruder screw has a solid feed section followed by a solid-melt transition section, followed by a melt metering section. At least three spiral channels are formed on the screws' outer circumference. One of the spiral channels is a solid feed channel located to receive solid plastic from the feed hopper and longitudinally convey the solid plastic particles as the particles start to melt. The solid feed channel extends along the length of the extruder screw and ends within the solid-melt transition section. The second spiral channel is a solid-melt channel, and extends longitudinally from the beginning to the end of the solid-melt transition section. The third spiral channel is a melt channel. The melt channel begins within the solid-melt transition section, just after the end of the solid feed channel and extends longitudinally to the end of the melt metering section.

The invention, as well as its many advantages, may be further understood by reference to the following detailed description and drawings in which:

FIG. 1 is a broken longitudinal view of a preferred embodiment of the extruder screw;

FIG. 2 is a sectional view on an enlarged scale, taken along lines 2—2 of FIG. 1 in the direction of the arrows, and also showing in section a portion of the barrel in which the screw fits;

FIG. 3 is an enlarged, sectional view taken along lines 3—3 of FIG. 1 and in the direction of the arrows;

FIG. 4 is an enlarged, sectional view taken along lines 4—4 of FIG. 1 and in the direction of the arrows;

FIG. 5 is an enlarged, sectional view taken along lines 5—5 of FIG. 1 and in the direction of the arrows;

FIG. 6 is an enlarged, sectional view taken along lines 6—6 of FIG. 1 and in the direction of the arrows;

FIG. 7 is an enlarged, sectional view taken along lines 7—7 of FIG. 1 and in the direction of the arrows; and FIG. 8 is an enlarged, sectional view taken along lines 8—8 of FIG. 1 and in the direction of the arrows.

In the various Figures, like parts are referred to by like numbers.

Referring to the drawings, and more particularly to FIG. 1, the extruder screw 10 has a solid feed section followed by a solid-melt transition section, followed by a melt metering section. The extruder barrel in which the extruder screw shown in FIG. 1 is designed to fit, is not shown in FIG. 1. However, those skilled in the art will recognize that a solid plastic in the form of pellets, or flakes, or other particles will be fed into a feed hopper from which the solid particles or pellets will flow into the solid feed section.

There are at least three separate spiral channels formed on the outer circumference of the extruder screw 10. One of said channels is a solid feed channel 12 located to receive the solid plastic particles from the feed hopper and longitudinally convey the solid plastic particles as the particles start to melt. The solid feed channel 12 extends along the length of the extruder screw and ends within the solid-melt transition section.

A second spiral channel formed on the outer circumference of the extruder screw 10 which will be called herein a solid-melt channel 14 extends longitudinally from the beginning to the end of the solid-melt transition section.

The third spiral channel formed on the outer circumference of the extruder screw 10 which will be called herein the melt channel 16 begins longitudinally within the solid-melt transition section, just after the end of the solid feed channel 12 and extends longitudinally to the end of the melt metering section.

As can be seen by reference to FIG. 1 and FIG. 2, the flight 18 of the solid feed channel 12 has a substantially constant outside diameter within the solid feed section. The outside diameter of the flight 18 is substantially the same as the inside diameter of the heated extruder barrel 20 in which the extruder screw 10 fits.

Within the solid melt transition section, a barrier flight 22 is formed on the outer circumference of the extruder screw 10. The outside diameter of the flight 22 is less than the inside diameter of the heated extruder barrel 20, as clearly seen in FIG. 3 through FIG. 5. Sufficient space is provided between the flight 22 and the barrel 20 to permit the mixture of solids and melt to flow from the solid feed channel 12 to the solid-melt channel 14. Flight 24 has substantially the same outside diameter as the inside diameter of the barrel 20 and forms one side of the solid feed channel 12 and one side of the solid-melt channel 14. The barrier flight 22 is common to the solid feed channel 12 and the solid-melt channel 14.

The depth of the solid feed channel 12 is substantially constant, and the longitudinal spacing of flight 18 along a longitudinal plane is substantially constant throughout the solid feed section. However, the depth of the solid feed channel 12 continually decreases as it extends forwardly within the solid-melt transition section. The longitudinal spacing of the flights forming channel 12 in the solid-melt transition section is less than the longitudinal spacing of flight 18 in the solid feed section.

The flight 30 of the melt channel 16 has a substantially constant outside diameter for the total length of the melt metering section with its outside diameter being substantially the same as the inside diameter of the heated extruder barrel 20. Within the solid-melt transition section a barrier flight 32 is formed on the outer circumference of the extruder screw 10 which has an outside diameter less than the inside diameter of the barrel 20. The clearance between the barrier flight 32 and the inside of the barrel 20 is less than the clearance between the barrier flight 22 and the inside of the barrel 20. Flight 34 has substantially the same outside diameter as the inside diameter of the barrel 20 and forms one side of the solid-melt channel 14 and one side of the melt channel 16. Barrier flight 32 is common to the melt channel 16 and the solid-melt chaannel 14.

The depth of that portion of the melt channel 16 within the solid-melt transition section continually increases as it progresses from its beginning within the solid-melt transition section to the end of the solid-melt transition section. The depth of that part of the solid-melt channel 14 which has the barrier flight 22 common to the solid feed channel 12 continually increases as it extends forwardly within the solid-melt transition section and the depth of that part of the solid-melt channel 14 which has barrier flight 32 common to the melt channel 16 continually decreases as it extends forwardly within the solid-melt transition section.

The longitudinal spacing of the flights forming solid-melt channel 14 is substantially the same throughout its length. The longitudinal spacing of the flights forming melt channel 16 is less in the solid melt transition section than the longitudinal spacing of flight 30 in the melt metering section.

The first barrier flight 22 with the larger clearance from the inside of the barrel 20 exposes the cool center core of the solid bed and pellets to the heated barrel inner surface without creating a high restriction to the flow. Each pellet or particle is flattened as it flows through the flight clearance, generating more solid surface area to the hotter melt. As a result, a lower and more uniform temperature mixture of solids and melt goes through the solid-melt transition section. The second barrier flight 32 with its smaller clearance from the inside of the barrel 20 acts only as a final screen for the melt. Due to little or no cool core of solids at the discharging section of channel 14 to temporarily block or slow down the flow over the small clearance of flight 32, the material moves through the screw in a more streamlined pattern. Materials are worked more evenly and efficiently than with previous extruder screws, and no melting has to be done in the metering section. Therefore, the extruder can be constructed to handle the maximum melting capacity of the screw.

I claim:

1. An extruder screw for use in a plastic extruder having a solid plastic feed hopper and a heated barrel; said extruder screw having a solid feed section followed by a solid-melt transition section followed by a melt metering section and having at least three spiral channels formed on its outer circumference, one of said spiral channels being a solid feed channel located to receive solid plastic from the feed hopper and longitudinally convey the solid plastic particles as the particles start to melt, said solid feed channel extending along the length of the extruder screw and ending within the solid-melt transition section the flight of said solid feed channel being a substantially constant outside diameter within the solid feed section, said outside diameter being substantially the same as the inside diameter of the heated extruder barrel the extruder screw fits so that substantially no solid plastic particles or melt flows over said flight; another of said spiral channels being a solid-melt channel, said solid-melt channel extending longitudinally from the beginning to the end of said solid-melt transition section, a barrier flight being formed on said extruder screw within said solid-melt transition section and having an outside diameter less than the inside diameter of the heated extruder barrel the extruder screw fits, said barrier flight being common to and forming one side of the solid feed channel and forming one side of the solid-melt channel and having an outside diameter sufficiently less than the extruder barrel inside diameter to permit a mixture of solid plastic particles and melt to flow from the solid feed channel to the solid-melt channel, the other side of the solid feed channel and the other side of the solid-melt channel being formed by a flight having substantially the same outside diameter as the inside diameter of the barrel; and the third spiral channel being a melt channel, said melt channel beginning within the solid-melt transition section just after the end of the solid feed channel and extending longitudinally to the end of the melt metering section; and a second barrier flight being formed on said extruder screw within the solid-melt transition section and having an outside diameter greater than the outside diameter of the other barrier flight, said second barrier flight being common to and forming one side of the melt channel and forming one side of the solid-melt channel and having an outside diameter less than the extruder barrel inside diameter but yet sufficiently great to permit only melt to flow over said second barrier flight from the solid-melt channel to the melt channel and the other side of the solid-melt channel and the other side of the melt channel being formed by a flight having substantially the same outside diameter as the inside diameter of the barrel the flight of said melt channel having a substantially constant outside diameter within the melt metering section, said outside diameter being substantially the same as the extruder barrel inside diameter so that substantially no melt flows over said flight.

2. An extruder screw in accordance with claim 1 wherein: the depth of the solid feed channel is substantially constant in the solid feed section and continually decreases as it extends forwardly within the solid-melt transition section, and the depth of that part of the solid-melt channel having a barrier flight common to the solid feed channel continually increased as it extends forwardly within the solid-melt transition section.

3. An extruder screw in accordance with claim 2 wherein: the depth of that portion of the melt channel within the solid-melt transition section continually increases as it progresses from its beginning within the solid-melt transition section to the end of the solid-melt transition section, and the depth of that part of the solid-melt channel having a barrier flight common to the melt channel continually decreases as it extends forwardly within the solid-melt section.

* * * * *